United States Patent [19]
Gammel et al.

[11] Patent Number: 5,974,363
[45] Date of Patent: *Oct. 26, 1999

[54] SELF-TESTING OF SMART LINE CARDS

[75] Inventors: John C. Gammel, Marion Township, Berks County, Pa.; Christine Mary Gervesh, Scotch Plains, N.J.; Randy Lee Hafer, Kutztown, Pa.; Ronald Joseph Rees, Bollingbrook, Ill.; Dewayne Alan Spires, Plaistow, N.H.; Robert Henry Vaiden, Allentown, Pa.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/835,603

[22] Filed: Apr. 9, 1997

[51] Int. Cl.$^6$ ...................................................... H04M 1/24
[52] U.S. Cl. ................................ 702/117; 379/1; 379/10; 379/29; 370/241
[58] Field of Search ..................................... 702/117, 118, 702/123, 124, 182, 183, 185, 188; 379/1, 5, 6, 9, 10, 15, 27, 29; 370/241, 242, 250, 252

[56] References Cited

U.S. PATENT DOCUMENTS

| | | | |
|---|---|---|---|
| 4,581,493 | 4/1986 | Gazzo et al. | 179/175.2 |
| 4,611,320 | 9/1986 | Southard | 370/13 |
| 4,972,360 | 11/1990 | Cukier | 364/724.04 |
| 5,003,554 | 3/1991 | Chism | 375/10 |
| 5,005,197 | 4/1991 | Parsons et al. | 379/21 |
| 5,208,846 | 5/1993 | Hammond et al. | 379/15 |
| 5,335,020 | 8/1994 | Dieterich | 348/614 |
| 5,473,666 | 12/1995 | Szczebak, Jr. et al. | 379/3 |
| 5,528,661 | 6/1996 | Siu et al. | 379/27 |
| 5,548,540 | 8/1996 | Staver | 364/724.1 |
| 5,559,440 | 9/1996 | Lopresti | 324/607 |
| 5,596,322 | 1/1997 | Marsh | 341/120 |
| 5,615,225 | 3/1997 | Foster et al. | 379/29 |
| 5,646,521 | 7/1997 | Rosenthal et al. | 324/158.1 |
| 5,677,941 | 10/1997 | Rice | 379/2 |
| 5,835,565 | 11/1998 | Smith et al. | 379/5 |
| 5,835,566 | 11/1998 | Cowgill | 379/10 |
| 5,838,766 | 11/1998 | Rand | 379/9 |

OTHER PUBLICATIONS

Schlumberger Technologies News Release, "Application-specific ATE provides an econoic test solution for telecoms modules", Dec. 1987.

Campbell, "Telecoms Production Testing: A New Approach", Telecommunications Journal, Aug. 1992.

*Primary Examiner*—Patrick Assouad

[57] ABSTRACT

Automatic testing a group of line circuits on a smart line card served by a central switch over a PCM bus is localized by using the microprocessor/DSP that provides codec functions for the group of line circuits. Tests such as DC overhead that are not performable by the central switch over the PCM bus are performed by the microprocessor/DSP when informed by the central switch that at least one of the channels is not processing voice signals. The microprocessor/DSP controls test switches on the line card to set-up various test terminations for the idle circuit as well as to selectively control the gain of the idle channel's amplifiers. The microprocessor/DSP synthesizes test tones and executes test tone detection processes within the time slot intervals accorded by the central switch to the idle channel. Among the tests performed are Forward Loop Gain with different resistance terminations, cable and fuse tests, DC overhead, and idle channel noise utilizing a limited number of test routines such as tone generation, DC generation, discrete Fourier transform, peak detection and variance from acceptable limits. The pass/fail condition of the idle channel under test is reported to the central switch.

30 Claims, 9 Drawing Sheets

SELF-TESTING OF SMART LINE CARDS

FIELD OF THE INVENTION

This invention relates to the testing of transmission paths and, more particularly, to the analysis of paths traversing line circuits containing analog to digital (A/D) and digital to analog (D/A) converters including coder/decoder circuits (codecs).

BACKGROUND OF THE INVENTION

The testing of customer loops by the central switch in modern digital telephone switching systems, such as the 5ESS Switch manufactured by Lucent Technologies Inc., is performed on both an analog and digital basis. Digital testing alone does not provide sufficient fault coverage of line card circuitry, and therefore, the performance of additional tests requires the direct connection of a test unit to check the electrical parameters of the subscriber loop. Digital testing is disclosed in Marsh et al, U.S. Pat. No. 5,596,322 issued Jan. 21, 1997 which describes a 16-channel programmable codec known as the T7531/35 manufactured by Lucent Technologies Inc. The Marsh patent employs the codec's DSP to calibrate or trim the amplifier gains of 14 of the channels based on the factory calibration of only two of the channels. In the Marsh method, the DSP applies analog calibration signals to each of the A/D paths and compares the output signals received from the paths with the output signal received from the pre-trimmed path to determine the A/D gain correction coefficients for the paths. The DSP also applies a digital calibration signal to each D/A path and sets up a loop-back condition for routing the output signal from the D/A paths to one of the A/D paths and then compares the results to set the D/A coefficients.

Another digital testing technique is disclosed in Lopresti et al U.S. Pat. No. 5,559,440 issued Sep. 24, 1996 and assigned to Lucent Technologies Inc. The Lopresti patent describes tests of the transmit and receive paths that traverse the line circuits by temporarily plugging in a personal computer to the line circuit's PCM bus to ascertain whether the A/ID and D/A channel gains, return loss, terminal balance return loss, noise and distortion parameters are within acceptable limits.

While the Marsh and Lopresti arrangement operate satisfactorily, the need exists for an automated, self-testing capability on the line card that does not require the connection of a personal computer to perform floating point calculations or to generate and detect the test tones. In addition, it would be desirable to perform certain tests on the line circuits, such as DC overhead measurement and peak amplitude measurement that cannot be performed by a central switching facility linked to the line circuits by a PCM bus and which introduces its attendant complications of companding, filtering, limited data sampling rate and the inability to convey DC signals.

While it might appear to be desirable to perform such tests locally at the line card and thereby eliminate the effects of the PCM bus, the implementation of such tests at the line card presents several problems. Among the problems presented are how to implement with limited processing capability the necessary digital tone generation and detection, how to compute the variance of signals having different DC offsets, how to accomplish peak detection all without substantially interfering with voice processing.

SUMMARY OF THE INVENTION

The foregoing and other aspects and features of the invention are achieved in one illustrative embodiment in which automatic testing of a group of smart line cards arranged on a line card pack served by a central switch over a PCM bus is localized at the line card by using a microprocessor/DSP provided to perform speech coding and decoding ("codec") functions for the group. Tests such as DC overhead and cable and fuse tests that are not performable by the central switch over the PCM bus are performed locally at the line card by the microprocessor/DSP when the central switch informs the line card that the codec voice processing function is not required for at least one channel, i.e, there is at least one idle channel available on the line card. The microprocessor/DSP controls test switches individual to the line circuit associated with the idle channel as well as switches common to the line card pack to set-up various analog test terminations as well as to selectively control the gain of the idle channel's amplifiers. The microprocessor/DSP synthesizes test tones and executes test tone detection processes within the time slot intervals accorded by the central switch to the idle channel. Among the tests performed are measurement of the forward loop gain with different resistance terminations, cable and fuse tests, DC overhead, and idle channel noise. The microprocessor formats sequences of instructions ("vector files"), and issues them to the DSP to initiate a detailed self-test of the transmit and receive paths traversing the line circuits using a limited number of test routines such as tone generation, DC generation, discrete Fourier transform, peak detection and variance from acceptable limits and advises the central switching facility as to the pass/fail status of the line circuits.

According to one aspect of the illustrative embodiment, the switch need merely be provided with the identity of which line circuit is currently idle. According to another aspect, test routines are advantageously accomplished with a simple microprocessor/DSP which uses only fixed-point rather than floating point calculations and the generation of digital tones may be accomplished using a critically-damped, recursively excited IIR filter to reduce the amount of processing time required.

BRIEF DESCRIPTION OF THE DRAWING

The foregoing aspects and features of the invention may become more apparent when the ensuing description is read together with the drawing in which.

GENERAL DESCRIPTION

Figure 1:
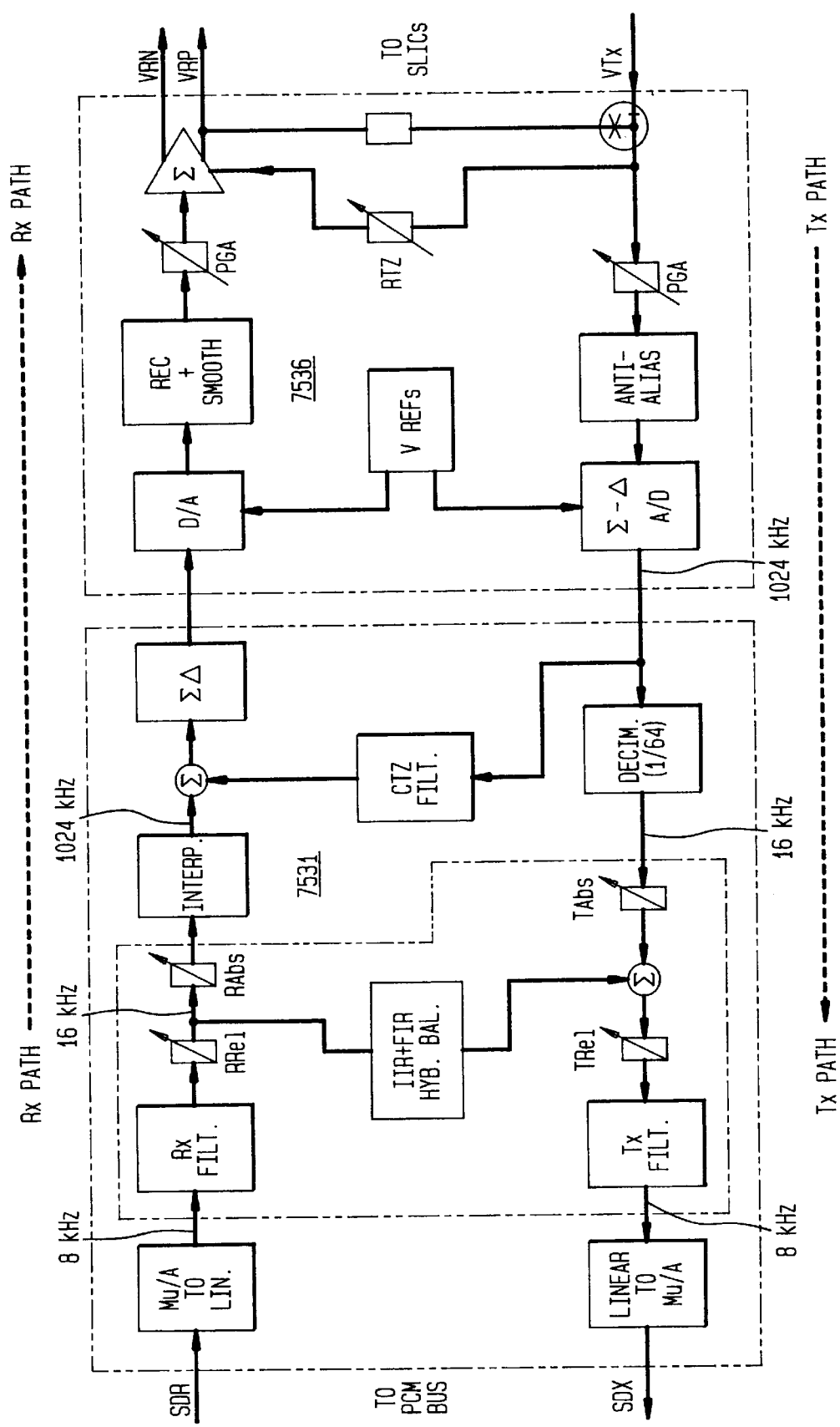
FIG. 1 depicts the prior art arrangement of Marsh U.S. Pat. No. 5,596,322 which employs the codec's DSP to execute a limited set of digital tests.

FIG. 1 depicts the prior art Marsh patent's 16-channel codec 7531 containing a digital signal processor DSP that performs a number of functions. Before describing, in connection with FIG. 2, how the DSP is put to work to accomplish the test procedures of the present invention, it is appropriate to briefly summarize its prior art functions. A central switching facility (not shown in FIG. 1, but see FIG. 2) is at the remote end of the PCM bus at the left. The receive path Rx from the PCM bus through the codec is shown above and the transmit path Tx through the codec to the PCM bus is shown below. An associated analog-digital converting front end 7536 serves a group of 16 subscriber line interface circuits (SLICs), indicated at the right. The core structure of the codec's DSP performs those functions enclosed within the dotted outline frame at the left, including, receive path filtering Rx Filt.; control of receive path relative gain RRel; control of receive path absolute gain RAbs; filtering and hybrid balancing IIR+FIR Hyb. Bal.; transmit path filtering TxFilt.; control of transmit path relative gain TRel; summation for hybrid balancing $\Sigma$; and transmit path absolute gain control TAbs. Other functions controlled by the 7531 include translation between the linear encoding used in speech processing and the Mu-law or A-law encoding of signals employed by the PCM bus; decimation Decim.; interpolation Interp.; sigma-delta encoding of the voice channel bit streams and impedance synthesis filtering by CTZ Filt.

In the receive path Rx, the Mu-law or A-law signal, received from the PCM bus at the left, is converted to a 16-bit linear PCM signal. The linear 16 bit PCM signal is filtered and interpolated to 16 k-samples/second. This filtering smooths the data following interpolation from 8 k-samples/second to 16 k-samples/second. The gains to be accorded the linear PCM signals are digitally adjustable to absolute and relative gain values, advantageously specified as 15-bit binary numbers representing their linear magnitude. The default value is 0 dB relative gain and –0.211 dB gain for the absolute gain. Gain is adjustable from minus infinity dB to +6 dB relative gain or +5.8 dB absolute gain.

Gain for a given loop served by a SLIC may be established by setting a coarse gain in the programmable gain amplifiers RGA and TGA in the analog front end 7536 associated with the given loop and by setting, on a per-channel basis, the controllable digital amplifiers RAbs, TAbs in the DSP's core. Relative gain can then be set on a real-time basis as required for each call by adjusting digital amplifiers RRel and TRel in the DSP's core. Absolute gain and relative digital gain can be set using per-channel coefficients which allow individual gain adjustment on each channel.

Hybrid balance is provided by a 9-tap FIR and a single-pole IIR digital balance filter in which a replica of the echo is digitally subtracted from the transmit plus near-end echo signal. The coefficients are user-programmable on a per line basis. The capacitive component for impedance matching is furnished by filter CTZ which synthesizes complex termination impedances utilizing alpha and beta coefficients. A set of alpha and beta coefficients is employed for each termination impedance and balance network. The alpha bits represent the RC time constant of the impedance to be synthesized while the beta bits represent the dc gain of the filter. Setting beta to zero turns off the CTZ filter function.

The sampling frequency of the receive signal from the digital gain adjustment is increased from 16 kHz to 64 kHz by the 16-channel interpolator Interp, which removes most of the high frequency signal images above 8 kHz and also maps each of the 16 time slots to the appropriate line channel through the 16-channel digital sigma-delta modulator $\Sigma\Delta$. The digital sigma-delta modulator converts the interpolated signal to 1024 kHz per channel bit stream which is then fed to one of 16 analog front-end channels. Receive data enters at the left of the 7536 and the processed signal for each channel passes through a switched capacitor D/A and reconstruct filters, followed by a smoothing filter. A programmable gain amplifier PGA-R is followed by an output amplifier capable of driving a 2 k-ohm load to ±1.58 v. single ended or ±3.15 v. differential at peak overload. A precision on-chip voltage reference provides accurate transmission levels. The resistive component for termination impedance matching is furnished via variable attenuator RTZ.

The transmit path Tx receives the VTX signal from the line interface circuit SLIC indicated at the right together with a reference voltage, not shown, which is the DC offset voltage of the VTX signal for that channel. The input signal goes into programmable gain amplifier PGA and then through the anti-alias filter followed by analog to digital converter $\Sigma$-$\Delta$. The processed output signals are multiplexed into two groups of four channels each of which operates at 4.096 MHZ. Decimator Decim ($\frac{1}{64}$) filters out the high-frequency components, down-samples to 16 kHz and reorders the 16 channels of transmit signals into a sequences that is determined by the time slot assignment. The gains of the transmit absolute gain amplifier TAbs and relative gain amplifier TRel are specified as 15-bit binary numbers representing their linear magnitude. Gain can be varied from minus infinity dB (0) (0000 hexadecimal) to +6 dB relative gain or +7.65 dB absolute gain (7FFF hexadecimal). The relative gain control allows TLP adjustment without hybrid balance or termination coefficient modification. The band pass filter Tx Filt in the transmit path removes power line and ringing frequencies and eliminates most of the signal energy at 4 kHz and above so that the encoder can transmit the filtered signal at 8 kilosamples per second, the world standard.

Figure 8:
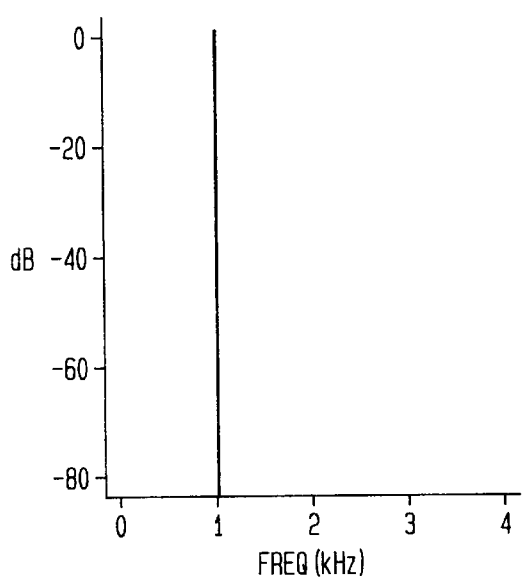
FIGS. 8 through 14 are spectral diagrams of sine waves at different points in the Tx and Rx paths of FIGS. 1 and 2.
Figure 9:
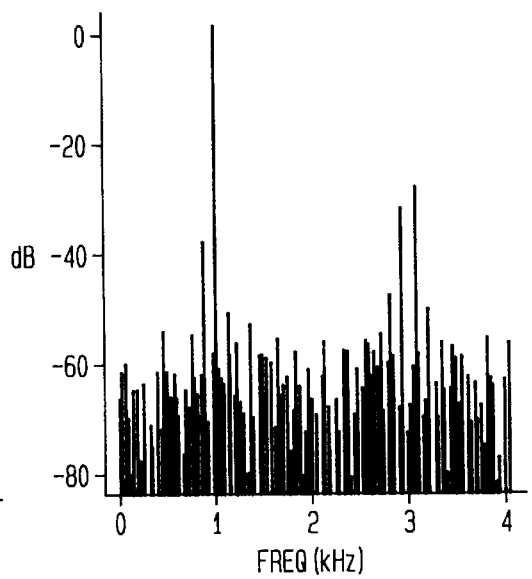
Figure 10:
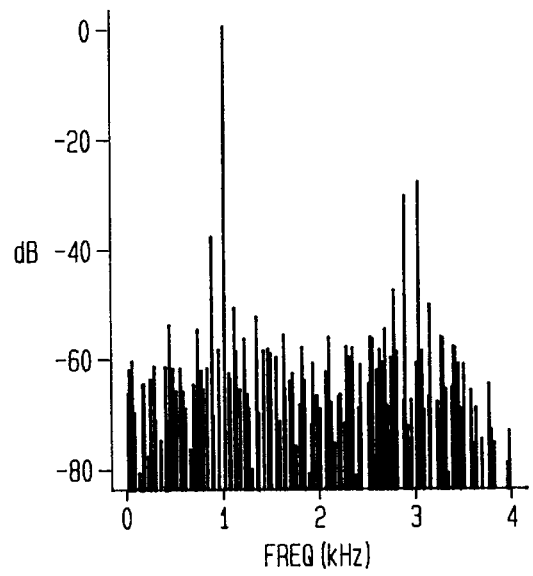
Figure 11:
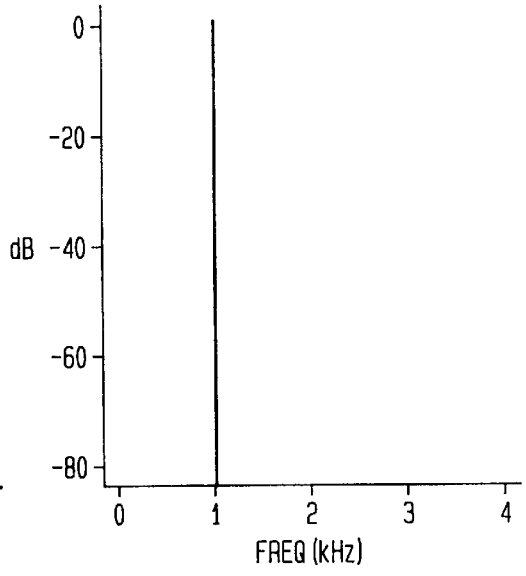
Figure 12:
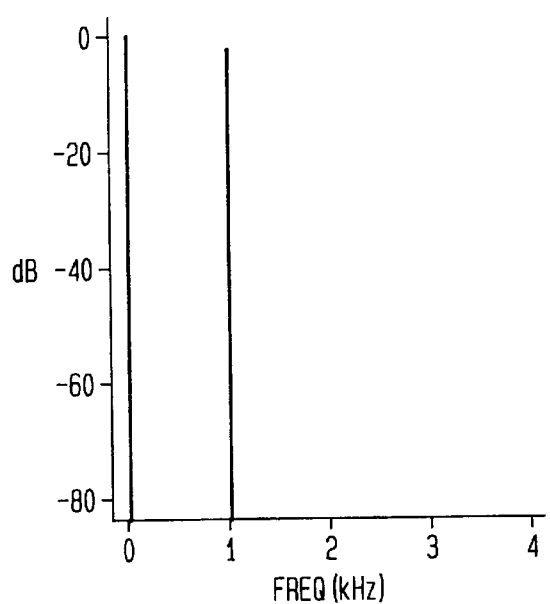
Figure 13:
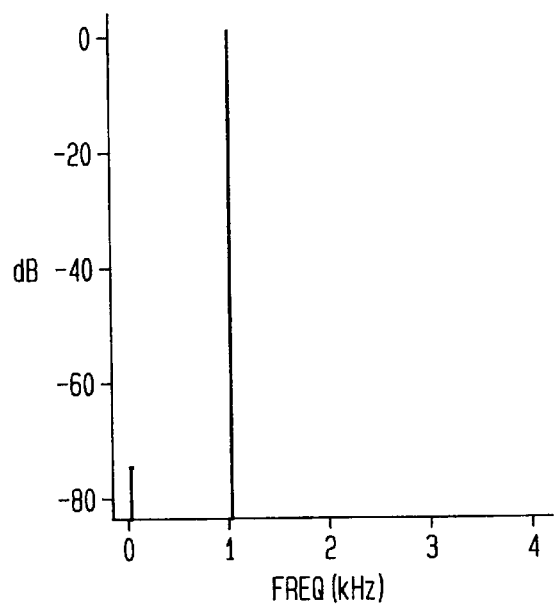
Figure 14:
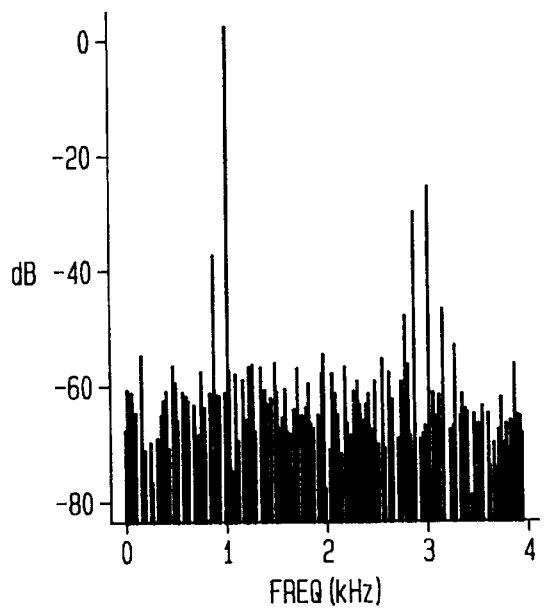

The problems presented by the prior art methods of analyzing codec signals are best illustrated by reference to FIGS. 8 and 9. FIG. 8(a) shows an exemplary test tone of 1.015 kHz having a 4 dB amplitude, assuming it to have been received at the Rx path of the codec over the PCM bus substantially noise-free down to –80 dB. This tone, after it exits the Mu/A law compander of the Rx path is shown in FIG. 8(b), which illustrates the addition of noise caused by quantization and saturation effects amounting to about –30 dB. FIG. 8(c) shows the companded signal having passed through the CCITT receive filter Rx Filt (which does not add significant noise). This would be the resultant "test tone" on which tests of the codec circuitry would be based using prior art methods. FIG. 8(d) shows the test tone generated in accordance with the invention, as hereinafter to be described. Assuming again, that prior art test methods are being utilized, FIG. 9(a) shows a noise-free 1.015 Hz test tone applied to the Tx path from interface circuit SLIC. This tone is assumed to have a large DC offset which may occur in certain situations. FIG. 9(b) shows this tone exiting the CCITT filter Tx filter which does not add significantly to the noise, but eliminates the DC component almost entirely before it is applied to the PCM bus. FIG. 9(c) shows the test tone of FIG. 9(a) after exiting the Mu/A law compander which raises the noise level by approximately 50 dB. This is the "test tone" that would be presented for analysis to the central switching facility at the remote end of the PCM bus using prior art test methods.

Figure 2:
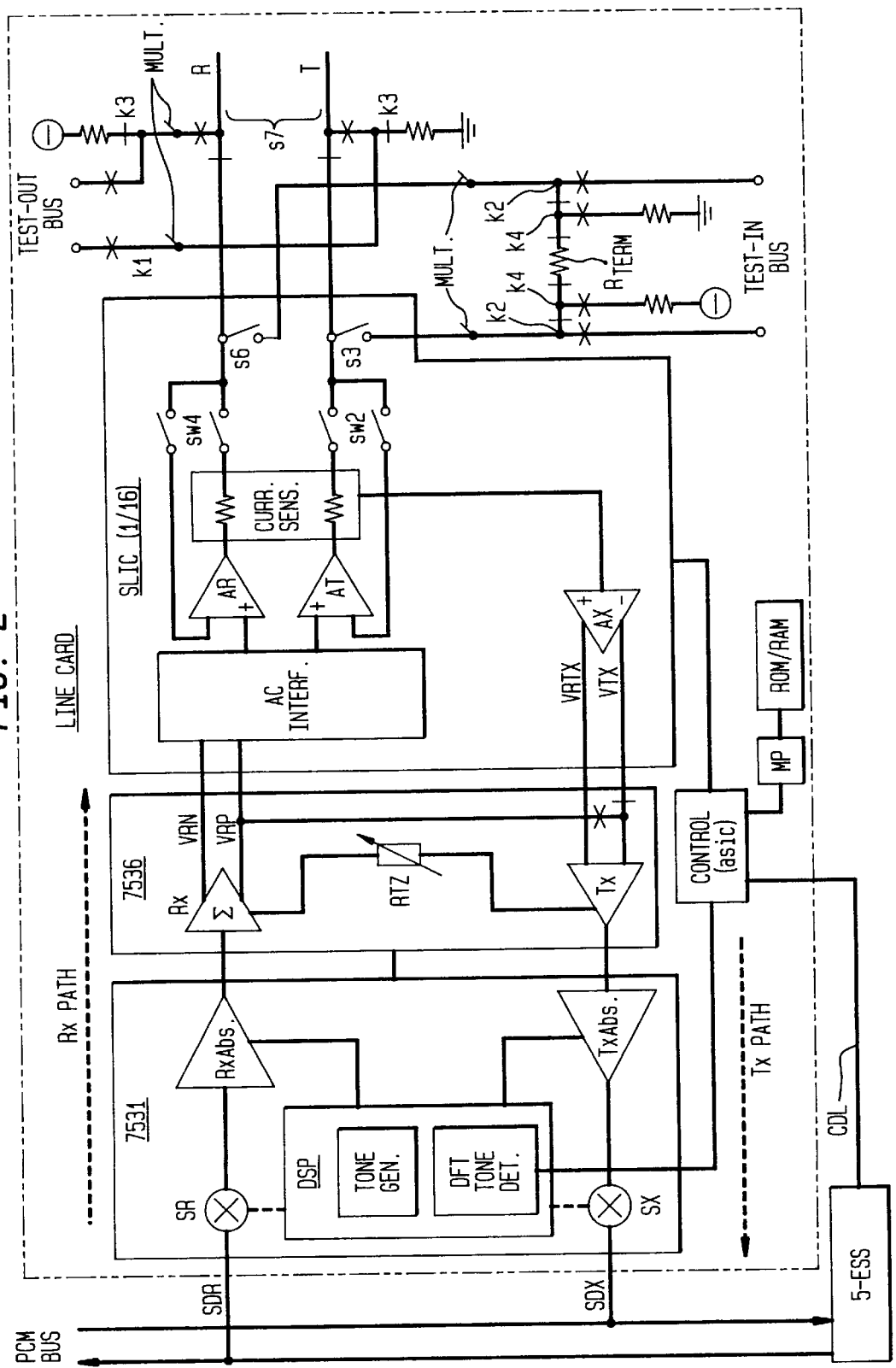
FIG. 2 shows an exemplary embodiment of the codec of the present invention which performs tests and employs the codec's microprocessor and DSP to control switches both individual to a line circuit and common to a group of line circuits.

Referring now to FIG. 2, the circuitry of the invention is shown. Codec 7531 and analog front end 7536 of FIG. 1 have been redrawn to more clearly show the relationship among the central switching facility 5-ESS, the PCM bus and the smart line card with one of its 16 SLICs shown in detail. When voice processing is not required on all 16 channels, central switching facility 5-ESS informs microprocessor MP over control data link CDL which time slots are idle. The MP allows time slot processing time to be allocated to a number of board test routines to carry out system and line integrity checks. The board tests controlled by the microprocessor MP and digital signal processor DSP are outlined in Table I, and are: forward loop gain (FLG); forward loop gain with 900 ohm termination (FLG 900); idle channel noise ICN; DC overhead (DCO); high resistance battery and ground at the tip and ring (SW7 NC Open); and cable and fuse test (CFT) simply by using five basic routines. These basic routines are: (a) tone generation, in which a user-definable sine wave signal is generated by the DSP and applied to the Rx path while the Rx filter is disabled; (b) DC generation in which a user-definable dc level is applied to the Rx path; (c) tone detection, in which the Tx part of the channel is used to detect signal energy from the line at a given frequency, illustratively up to 8 kHz with the transmit bandpass filters disabled using a discrete Fourier transform DFT which captures and analyzes the reflected tone and computes the power of the incoming signal at a designated frequency; (d) peak detection in which the incoming Tx signal is examined and the maximum and minimum signal values are saved; and (e) variance computation in which the variance from the computed mean level of small noise signals from the Tx path is found with the bandpass filter active to reduce out of band noise and remove DC offset.

Description of Tests

The tests are summarized in table I below. These tests are performed on all of 16 channels, following ROM and RAM checksum tests and calibration at power-up or reset before voice processing is allowed to commence on any channel. Thereafter, the tests are run routinely as desired on a per-channel basis whenever the channel is idle.

processor MP controls the states of switches sw2, sw3, sw4, and sw6 individual to the SLIC selected for testing as well as of switches k1, k2, k3, k4 and s7 common to the line pack serving 16 SLICs. During the FLG test, contacts of switches sw3 and sw6 and k2 and k4 cause terminating resistance RTERM be applied. The test takes into account the forward resistance of switches sw3 and sw4, typically 45 ohms each. The microprocessor also sets the SLIC under test to the forward battery active (FBA) state of the AC interface. Digital signal processor DSP generates a single, mid-band sinusoidal signal e.g., 1016 Hz at a level of e.g., −6 dBm (1.1 volts peak to peak) for a predetermined time, illustratively for 178 frames of the time slots and applies it to the Rx path. Tone detection using a DFT routine commences, illustratively, 50 frames after the start of tone generation. Tone detection continues, illustratively, for 128 frames. Loop gains are set up as they would be for normal system use. The applied tone signal (e.g., 1.1 volts peak to peak) passes through the Rx path without amplification until it reaches the +6 dB gain stage of the subscriber line interface circuit SLIC where it is amplified to 2.2 volts peak to peak across the tip and ring. Assuming that the transmit gain of the SLIC is set to 300 volt amperes, current gain is calculable as 300 divided by the total termination impedance. The signal is then amplified by the +6 dB Tx gain and ends up returning to the DFT measurement in the DSP. The Tx absolute gain compensates for the transmission level point transition level between the DSP and the analog front end but does not contribute to overall loop gain.

Forward Loop Gain with 900 Ohm Termination (FLG 900) Test

This test is similar to the FLG test and also uses the terminating resistance RTERM but synthesized impedance RTZ in the 7536 is set to 900 ohms and the Tx and Rx gains are interchanged. Loop gain should be similar to that found during the FLG test except that now the 900 ohm termination is part of the total termination impedance. The termination impedance assumes that two 82.5 ohm protection resistors are used in the tip and ring. For this test, the test-in lines are used rather than the tip and ring, therefore the

TABLE I (See FIG. 2)

| | | 7531 | | | | 7536 | | SLIC/Line Pack | | |
| --- | --- | --- | --- | --- | --- | --- | --- | --- | --- | --- |
| Test | Sig. (Hz) | Det. Rout. | Rx Abs (dB) | Tx Abs (dB) | Rx (dB) | Tx (dB) | RTZ (dB) | Ax (dB) | AC Int. (dB) | Ext Term |
| FLG | 1016 | DFT | +0.21 | −1.65 | 0 | +6 | No | −19.5 | FBA + 6 | 2740 Ω |
| FLG 900 | 1016 | DFT | −1.65 | +0.21 | +6 | 0 | 900 | −21.5 | FBA + 6 | 2740 Ω |
| CFT | 3937.5 | DFT | +0.21 | −1.65 | 0 | +6 | No | n.1 | FBA + 6 | Capac. T, R open |
| DCO | No | Peak | +0.21 | −1.65 | 0 | +6 | No | n.2 | FBA + 6 RBA | 40 kΩ |
| SW7 | 3937.5 | DFT | +0.21 | −1.65 | 0 | +6 | No | −∞ | FBA + 6 | Open |
| ICN | No | Var | −1.65 | +0.21 | +6 | 0 | 900 | −21.5 | FBA + 6 | 2740 Ω |

Notes:
n.1: Ax gain is dependent upon impedance of the capacitive reactance terminating tip and ring.
n.2: Ax gain in the forward battery active state is VOH/40 k * 300. Ax gain in the reverse battery active state is [((2 * Vbatt) − VOH)/40 k]*300.

Forward Loop Gain (FLG) Test

This test exercises the transmit and receive absolute gain amplifiers RAbs and TAbs of the codec as well as the transmit Tx and receive Rx gain amplifiers and the synthesized termination impedance RTZ of analog front end 7536. During this test RTZ is effectively open-circuited. Microadditional termination impedance becomes 900 minus twice 82.5 or 735 ohms so that a −15.5 dB signal is provided for DFT measurement by the DSP.

Idle Channel Noise Test

For this test all gain and termination settings are kept the same as the FLG900 test thereby avoiding the need for additional settling time. The DSP generates no signal during this test and the Rx inactive routine is executed. A variance routine is executed to monitor the noise from the test-in port. A test limit of −50 dBm0 is an appropriate illustrative limit. Since only transmit gain is a consideration in this test, the limit may be increased to −48.35 dBm0 to accommodate the transmission level point transition level between the 7531 and the 7536 in the Tx path. Variance computation is performed on the 8 kHz samples at the output of the CCITT filter Tx Filt in the Tx path of the 753. Since this filter substantially eliminates DC offset, the signal values are squared and the sum of the squares are computed for the duration of the test (n samples). The variance result (sum of the squares/n) is reported by the DSP to the microprocessor rather than the RMS value in order to complete processing within the constraint imposed by the limited number of processing cycles available at the microprocessor/DSP. If all other tests reported to the microprocessor MP are within prescribed limits, microprocessor MP reports a "pass" condition to the central switching facility over communication data link CDL.

DC Overhead Voltage (DC) Test

The DC overhead voltage is the difference between the open loop voltage and the battery voltage. For this test, the Rx side is in the inactive routine and the DSP sends no signal to the SLIC. To determine the overhead voltage, microprocessor MP controls switches k2 and k4 so that instead of RTERM, a 20K ohm resistor is placed between Vbat and the ring test input and another 20K ohm resistor is placed between ground and the tip test lead. Then, microprocessor MP operates switches sw3 and sw6. Before the operation of switches sw3 and sw6, the voltage between tip and ring will be battery voltage minus the overhead voltage. When these switches are operated, the line circuit is forced to full battery voltage. This causes a voltage spike, typically from −42 volts before the switches are closed to full battery (e.g., −48 volts) when the switches are closed. The spike is sensed by the current sensor and applied through amplifiers AX and Tx where it is measured by the peak detection routine in digital signal processor DSP. DC overhead voltage is checked for both forward battery active (FBA) and reverse battery active states of the AC interface. For the forward battery active state, the voltage spike equals Voh. Half of the overhead voltage appears across each 20K ohm resistor. The spike which is measured by the peak detector measurement routine in the DSP is determined by Voh/40K×300×2, the gain of 2 deriving from the Tx stage in the 7536. For reverse battery, the voltage spike that occurs is a positive spike, double the battery voltage minus the overhead voltage. The battery voltage minus half of the overhead voltage appears across each 20K resistor. Since the peak detector routine in the DSP measures an absolute peak, any DC offset caused by amplifier AX will appear as part of the result and the limits of the test should be adjusted to accommodate such offset. Alternatively, the delta of the minimum and maximum readings can be used to cancel any DC offset.

SW7 NC Open Test

This test performs the first check of the tip and ring lines. Microprocessor MP actuates the test-out electromechanical relay s7 on the Line Pack for this test and also exercise switches sw2 and sw4 of the SLIC under test. Actuation of switch s7 produces an open circuit on the tip and ring. The tone generation mode is used to produce a tone signal, e.g., 3937.5 Hz at 0 dBm signal (2.2 volts peak to peak) for 178 frames in the Rx path. A high frequency tone is used to optimize the reflected signal from s7 contact capacitance. The signal is amplified by 2 in the SLIC so that 4.4 volts is applied at the rip and ring. With an open circuit, the Tx gain of the SLIC is infinite, thereby returning no signal to be measured by the DSP's DFT routine. If s7 is faulty, a value greater than the limit, illustratively, −40 dBm0 would be realized due to the capacitance of tip and ring cabling.

Cable and Fuse Test (CFT)

This test checks the integrity of the tip and ring fuses (not shown), as well as the presence of a cable of proper length. It also exercises the tip and ring open features of the SLIC. To accomplish this, a tone signal, e.g. 3187.5 Hz at 0 dBm is generated by the DSP and applied to the Rx side. Like the previous test, a higher frequency is used to boost the reflected signal from the capacitive load. Microprocessor MP places the SLIC selected for test in the forward battery active state. When cable is present and the fuses are intact, the capacitive reactance of the cable allows some of the signal to couple back through the Tx path to be measured by the DFT routine in the DSP. The limit for this measurement is set, illustratively, to −47.5 dBm. A value larger than this will be obtained if a cable of longer than about 6 feet is present. This assumes 15 pfd per foot across tip and ring and 30 pfd per foot both tip to ground and ring to ground. When a long cable is present and a tip fuse is open, the cable has adequate capacitance so that the −47.3 dB limit can be easily exceeded. Because of this, two additional tests are required, Tip Open and Ring Open. Opening of either the tip or the ring path in the SLIC will have a dramatic influence on the measured result, if both fuses are intact. If the node is in an open state due to a blown fuse, however, the measured result and the forward battery active result will be similar. The pass criteria for these two open tests is that the result must be greater than ±4.3 dB when compared to the forward battery active result. The 4.3 dB value was determined empirically with regard to short cable capacitive results and the polarity insensitivity accommodates inaccuracies in the SLIC.

Overview of Flow Chart (FIGS. 3–7)

Figure 3:
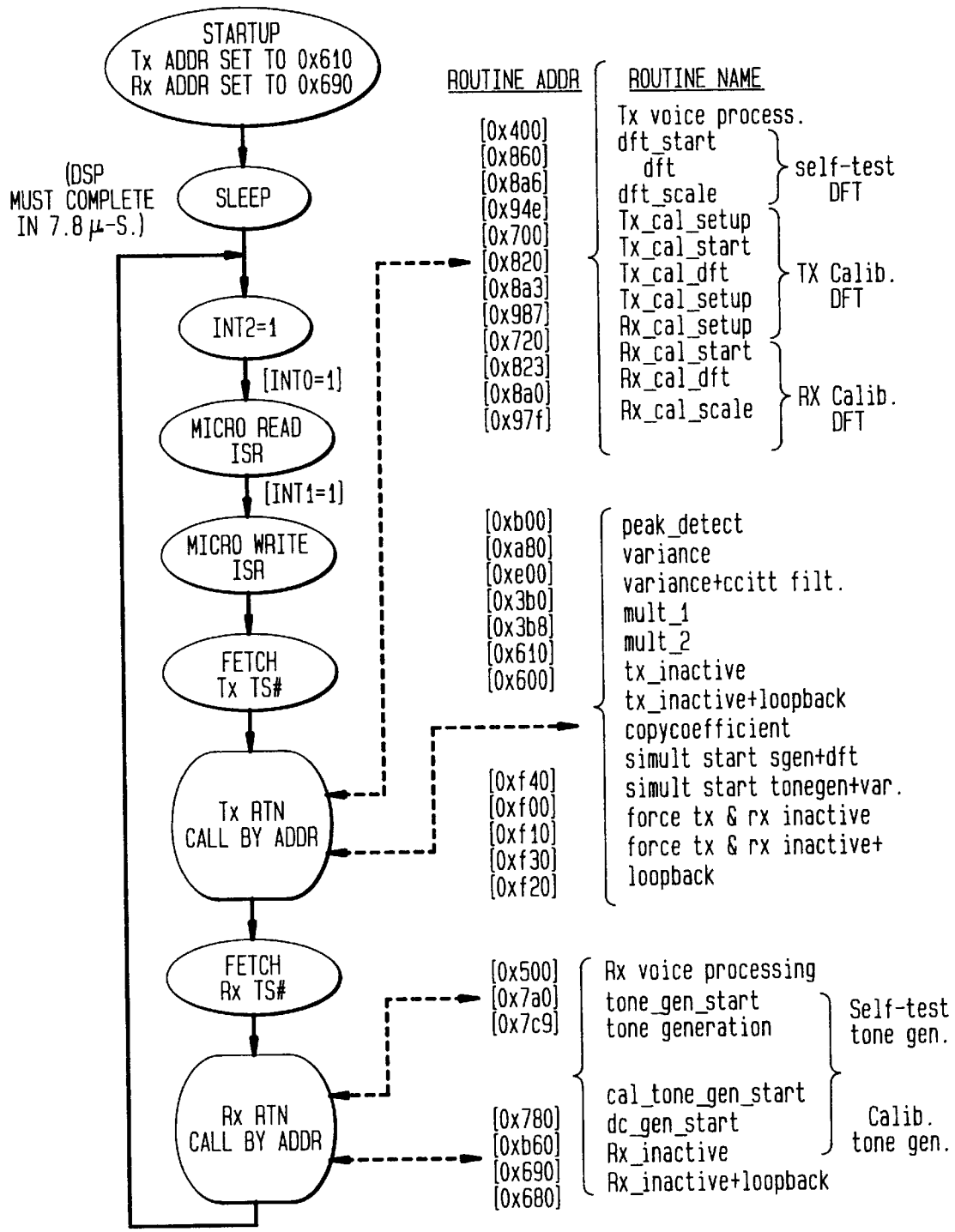
FIG. 3 shows a state chart of the firmware employed in the exemplary embodiment.
Figure 4:
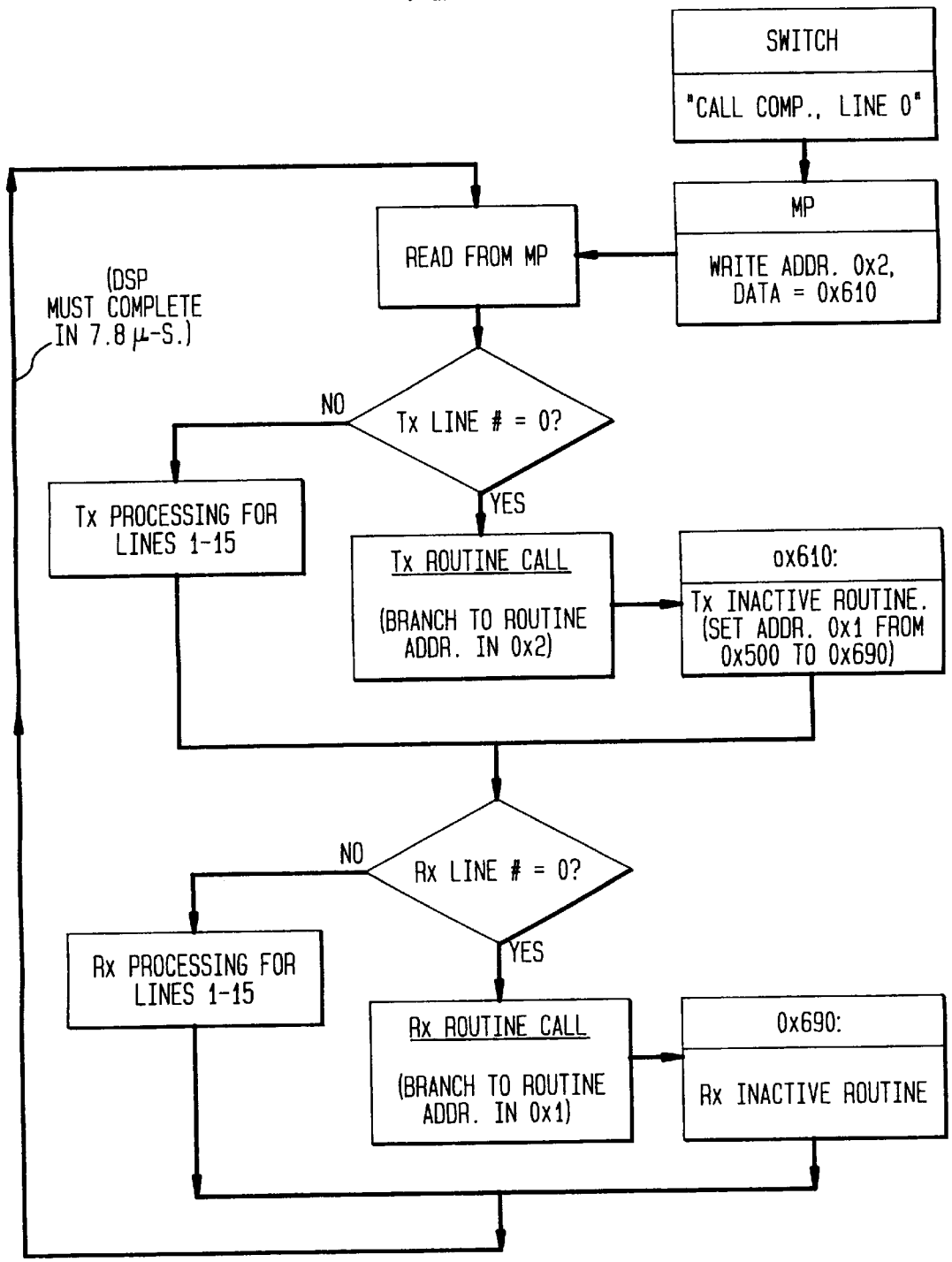
FIG. 4 is a flow chart showing the transition of a line circuit from voice processing to the inactive state in which tests may be performed.
Figure 5:
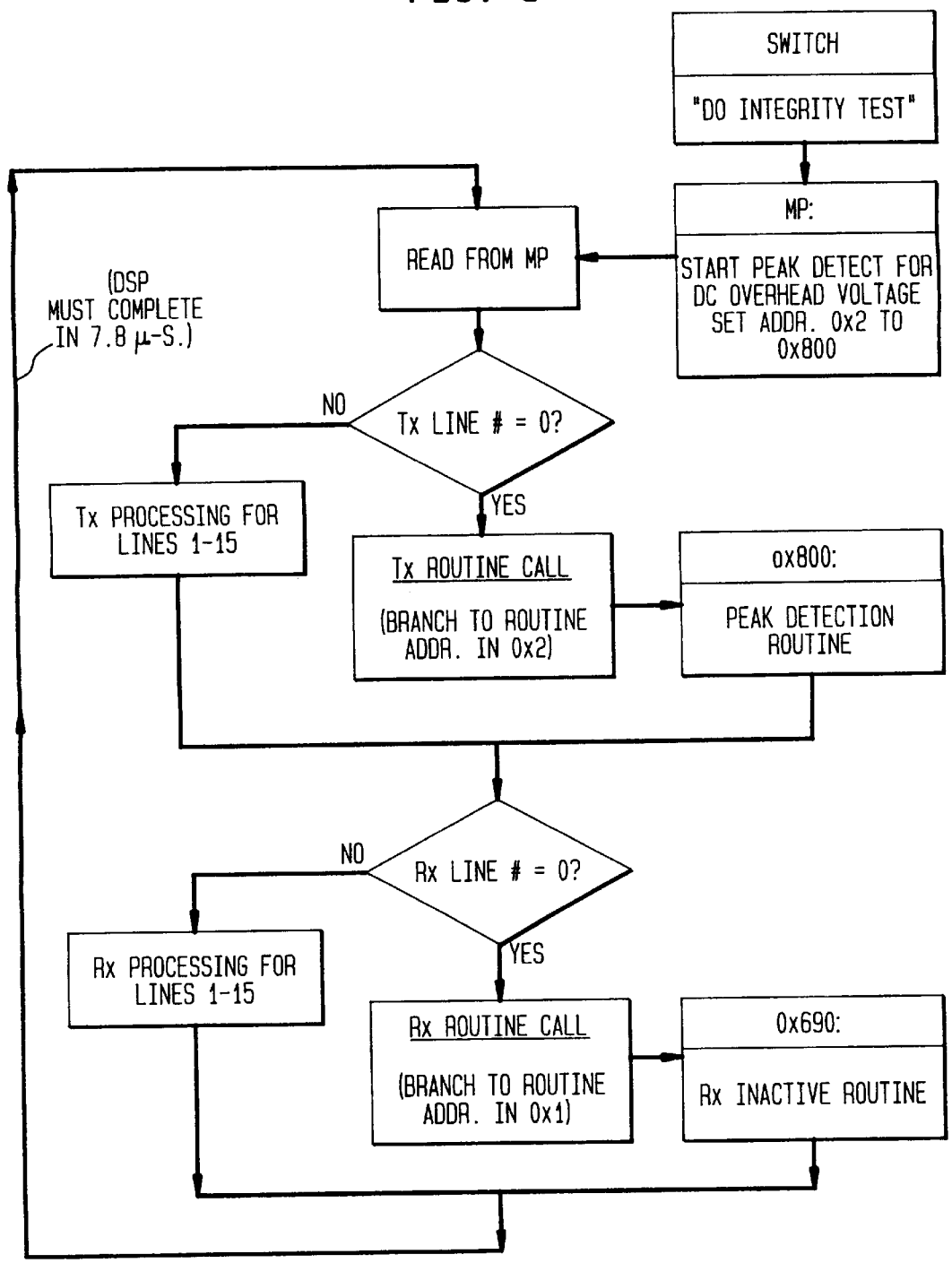
FIG. 5 is a flow chart showing the transition from the inactive state to the detection of the peak amplitude of the test tone.
Figure 6:
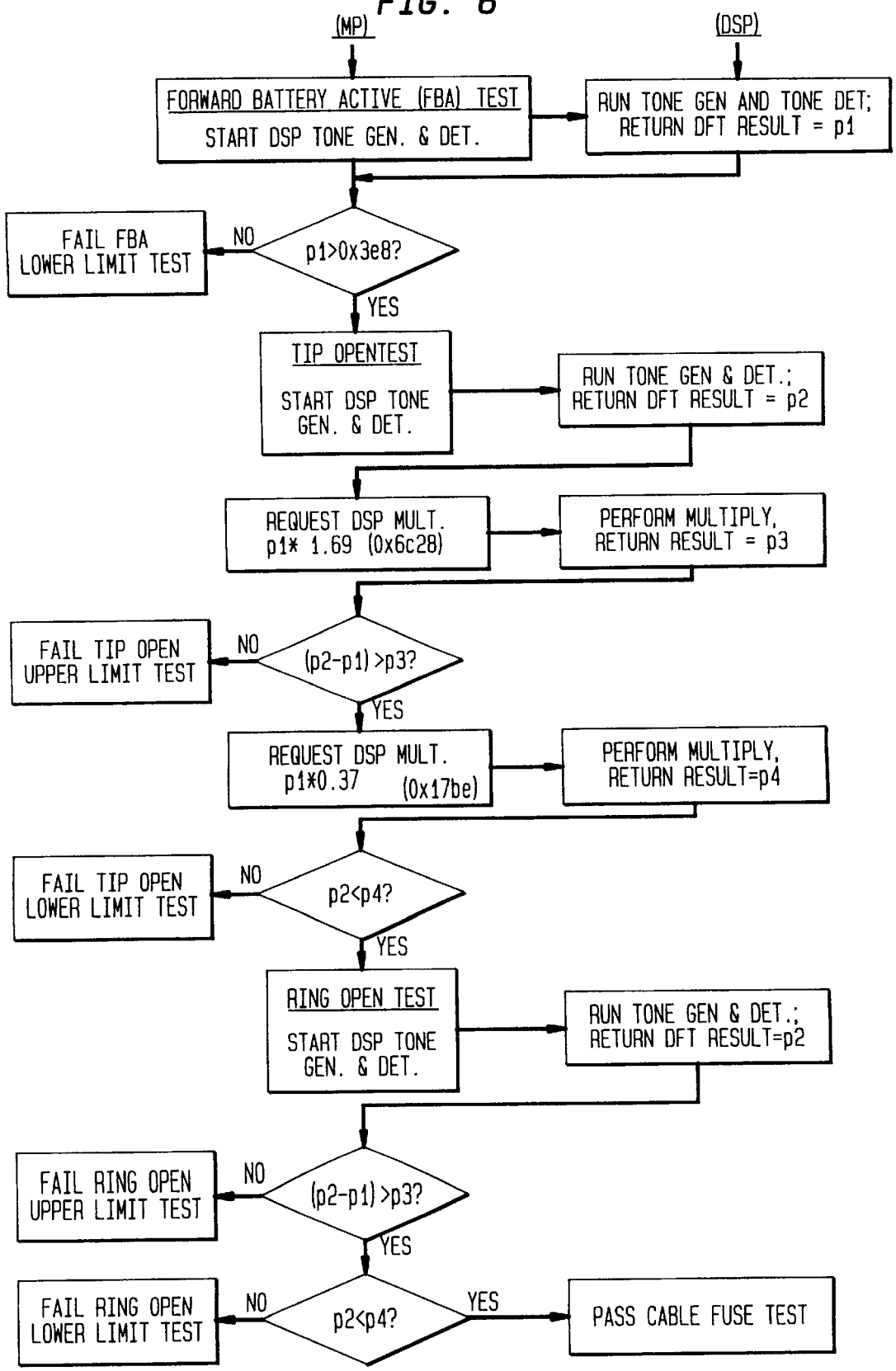
FIG. 6 is a flow chart showing the fuse test.
Figure 7:
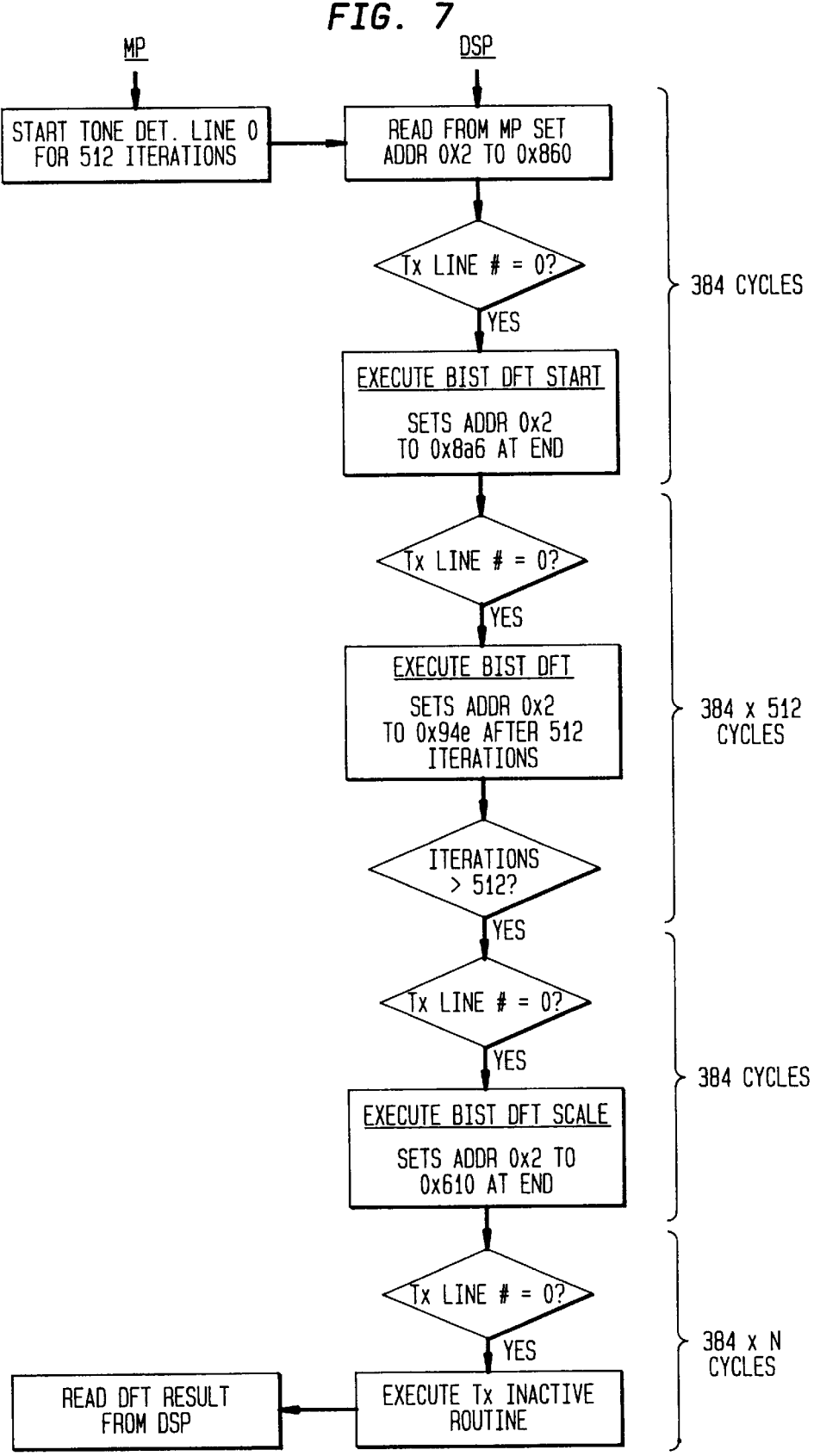
FIG. 7 is an exemplary flow chart showing the execution of chained routines by the digital signal processor (DSP) during prescribed time intervals.

Please refer now to FIG. 3. In order not to interfere with call processing, each pass through the DSP processing loop, FIG. 3, must be completed within the time allotted to process one channel's speech sample. In the illustrative embodiment, where there are 16 channels and speech is sampled at an 8 kHz rate, the time allotted for a single pass through FIG. 3 amounts to 1/16 of 125 or 7.8 microseconds. Where the DSP runs at 50 mips, this amounts to 384 machine cycles with each line circuit being processed round-robin in the 125 μ-second time frame. Excluding the overhead for context switching and communicating with microprocessor MP, each Rx routine must run in 110 cycles or less, and each Tx routine must run in 230 cycles or less. To avoid wasting cycles, the number of "if then" branches is severely restricted when deciding which routine shall be run. The process employed uses only 2 cycles per routine (i.e., 4 cycles per processing loop), and allows all 16 lines to execute different Rx and Tx routines with no extra cycle penalty. Thus, microprocessor MP must be pre-programmed with the start address in the DSP ROM of each of the Tx and Rx routines in the microprograms, one word of DSP RAM for each of the 16 lines holding the Tx routine address and one word holding the Rx routine address. In FIG. 3, chained routines are identified by curly brackets.

When a call terminates, the central switching facility so informs microprocessor MP over control data link CDL. In turn, microprocessor MP sets the Rx and Tx halves of the line circuit that was involved on the terminated call to the "inactive" routine in the DSP. Addresses for the inactive routines are written to the "Rx routine address" register and the "Tx routine address" register for that line in the DSP.

This effectively isolates the Rx and Tx paths from the PCM bus, as indicated by symbolical crosspoints SR and SX in FIG. 2. When the DSP processes that line circuit from then on, it will branch to these addresses and execute the "inactive" routine code that it finds there. If the line circuit is then required to perform a test, the microprocessor writes the test address(es) to the "Tx routine address" register and/or the "Rx routine address" register. When the DSP next processes that line circuit, it will branch to the code for the test and execute it.

Notes on the Digital Tone Generation and Detection Routines

In the preferred embodiment, neither trig functions nor lookup tables are used in order to conserve the number of processing cycles and memory locations required. Instead, a critically damped IIR filter is employed to generate the tone. The filter is started with an impulse and recursively excited using previous samples in the calculation of the present sample. Since tone generation becomes less accurate as more samples are generated, multiplications and subtractions are performed using double precision arithmetic.

A discrete Fourier transform (DFT) is used for tone detection, i.e., the power of the incoming signal at a designated frequency is computed. The basic algorithm requires calculation of sine and cosine samples at the frequency of interest but neither trig functions nor lookup tables are desirable to be used, as pointed out above. Instead, the successive sine and cosine functions are calculated by using a recursive function based on the relationship:

$$\cos(a+b) = \cos(a)\cos(b) - \sin(a)\sin(b) \text{ and } \sin(a+b) = \sin(a)\cos(b) - \cos(a)\sin(b).$$

The initial values for sin(a) and cos(a), the starting point, and (b), the step size based on frequency are advantageously computed off-line as trig functions and then fed to the routine. In converting the recursive algorithm to run on a fixed point DSP, multiplications and summations are advantageously to be performed using double-precision, 32-bit format. Likewise, the computation of the DFT's "an" and "bn" terms may advantageously be reduced to a shift operation if the DFT is restricted to operating on samples which are a power of 2.

What has been described is deemed to be illustrative of the principles of the present invention. Numerous modifications may be made by those skilled in the art without however departing from the spirit and scope thereof. For example, in the description above the sharing of tasks between the microprocessor MP and the digital signal processor DSP has been based on current technological determinations of what each is good at: the generally available DSP is at the present state of technology "good" at arithmetic operations but "poor" at control and decision making operations, while the opposite is true of the microprocessor. It will be apparent to the those skilled in the art that the use of large scale integration may make it desirable to incorporate the functions of the 7531 and the 7536 on the same chip, advantageously together with the functions of microprocessor MP and digital signal processor DSP as well.

What is claimed is:

1. A method of testing a line circuit having a processor-controlled codec for encoding and decoding speech signals without interfering with speech processing by said codec, said line circuit being served by a central switching facility, comprising the steps of:

formatting at said processor a sequence of vector files for initiating at least one test routine completeable while said line circuit is idle, establishing, responsive to instructions from said processor, test terminations for said line circuit to test the transmit and receive paths traversing said line circuit; and responsive to the completion of said test routines, furnishing said central switching facility an indication as to the status of said line circuit.

2. A method of testing a line circuit according to claim 1, wherein said indication is a pass/fail indication.

3. A method of testing a line circuit according to claim 1, wherein said test terminations are established by said processor controlling test switches common to a group of line circuits served by said central switching facility.

4. A method of testing a line circuit according to claim 3, wherein said speech signals are transmitted over a PCM bus linking said group of line circuits and said central switching facility and wherein said processor completes said test routine within the time interval accorded by said processor for processing said speech signals for said group of line circuits.

5. A method of testing a line circuit according to claim 4 wherein said processor selectively controls the gain of one of said line circuits having an idle time slot assigned on said PCM bus.

6. A method of testing a line circuit according to claim 5, wherein said processor selectively controls the application of a terminating impedance to said one of said line circuits having said idle time slot assigned.

7. A method of testing a line circuit according to claim 3, wherein said processor synthesizes test tones and executes test tone detection processes for said one of said line circuits within the time interval accorded by said processor for processing said speech signals for said group of line circuits.

8. A method of testing a line circuit according to claim 7 wherein said tone detection process employs a discrete Fourier transform to ascertain the power of said tone at a predetermined frequency.

9. A method of testing a line circuit according to claim 8 wherein said discrete Fourier transform is performed by recursively calculating:

$$\cos(a+b) = \cos(a)\cos(b) - \sin(a)\sin(b),$$

and by calculating:

$$\sin(a+b) = \sin(a)\cos(b) - \cos(a)\sin(b)$$

from initial values of sin (a) and cos (a), wherein (a) is said predetermined frequency and (b) is the step size taken in each recursion.

10. A method of testing a line circuit according to claim 9 wherein said processor controls the connection of terminations to said line circuit and measures the reflection of said tone signal resulting from said terminations.

11. A method of testing a line circuit according to claim 10 wherein said tone is a high frequency tone to optimize the signal reflected by an open circuit one of said terminations.

12. A method of testing a line circuit according to claim 7 wherein said test tones are recursively synthesized by said processor using a critically-damped IIR filter.

13. A method of testing a line circuit according to claim 2 wherein one of said test routines determines the DC overhead voltage for said line circuit.

14. A method of testing a line circuit according to claim 13 wherein said one of said test routines places said receive path traversing said line circuit in an inactive routine; said processor operates test switches to apply full battery voltage to said line circuit; and the resultant voltage change is measured by a peak voltage measurement routine in said processor.

15. A method of testing a line circuit according to claim 5 wherein said processor compares the results of said test routines with predefined test limits.

16. An arrangement for self-testing a line circuit in a group associated with a processor-controlled codec for processing speech signals without interfering with the speech processing for said group, comprising:

means for formatting at said processor a sequence of vector files defining a plurality of test routines, each of said routines being completeable within the time interval allotted by said processor for said speech processing; and means controlled by said processor for establishing test terminations for one of said line circuits to test the transmit and receive paths traversing said line circuit.

17. A self-testing arrangement for a group of line circuits according to claim 16 wherein said group of line circuits is served by a central switching facility, said arrangement including means associated with said processor and responsive to the completion of said test routines for furnishing said central switching facility an indication as to the status of said line circuit.

18. A self-testing arrangement for a group of line circuits according to claim 17 wherein said processor includes a microprocessor and a digital signal processor, said digital signal processor performing said test routines and said microprocessor retrieving test results from said digital signal processor.

19. A self-testing arrangement for a group of line circuits according to claim 18 wherein said microprocessor checks said test results against predefined test limits.

20. A self-testing arrangement for a group of line circuits according to claim 19 wherein said group of line circuits are connected to said central switching facility by a PCM bus, said arrangement including means for providing said microprocessor an indication of the availability of an idle channel on said PCM bus and means responsive to said indication of said idle channel for initiating one of said test routines on said idle channel.

21. A self-testing arrangement for a group of line circuits according to claim 20 wherein said microprocessor formats said sequence of vector files and furnishes them to said digital signal processor.

22. A self-testing arrangement for a group of line circuits according to claim 21 wherein said digital signal processor synthesizes test tones and executes test tone detection processes during said availability of said idle channel.

23. A self-testing arrangement for a group of line circuits according to claim 20, wherein said test routines selectively control the gain of said one of said line circuits having said idle channel assigned.

24. A self-testing arrangement for a group of line circuits according to claim 23, wherein said microprocessor selectively controls the application of terminating impedances to said one of said line circuits.

25. An arrangement for testing a line circuit having a processor-controlled codec for encoding and decoding speech signals without interfering with speech processing by said codec, said line circuit being served by a central switching facility, comprising a sequence of vector files in said processor for initiating at least one test routine completeable while said line circuit is idle, a sequence of instructions stored in said processor for controlling the establishment of test terminations for said line circuit to test the transmit and receive paths traversing said line circuit;

and for furnishing said central switching facility an indication as to the status of said line circuit upon the completion of said test routines.

26. An arrangement according to claim 25 further comprising test switches common to a group of line circuits served by said central switching facility, said sequence of instructions in said processor controlling said test switches.

27. An arrangement according to claim 26 further including a PCM bus linking said group of line circuits and said central switching facility; said processor being adapted to complete said test routine within the time interval accorded by said processor for processing said speech signals for said group of line circuits.

28. An arrangement according to claim 27 wherein said processor selectively controls the gain of one of said line circuits having an idle time slot assigned on said PCM bus.

29. An arrangement according to claim 28 wherein said processor selectively controls the application of a terminating impedance to said one of said line circuits having said idle time slot assigned.

30. An arrangement according to claim 29 wherein said processor synthesizes test tones and executes test tone detection processes for said one of said line circuits within the time interval accorded by said processor for processing said speech signals for said group of line circuits.

* * * * *